UNITED STATES PATENT OFFICE 2,128,4?2

PROCESS FOR CLARIFICATION AND REMOVAL OF IRON FROM BEVERAGES

William D. Ramage, Berkeley, Calif.

No Drawing. Application April 5, 1937,
Serial No. 135,167

6 Claims. (Cl. 99—48)

This invention relates to a new process for the clarification of wine and other beverages and the removal of iron therefrom, and particularly to the clarification and removal of iron from wine.

The clarification and removal of iron from wine is a standard winery practice. In some cases it is very difficult to reduce the iron content low enough to avoid subsequent hazing or clouding. Multiple filtration at intervals of several weeks is sometimes used. In spite of this costly procedure, hazing may still occur and even the wine flavor may be adversely affected.

Sodium ferrocyanide and its related compounds are often added to difficult wines to facilitate the iron removal. This procedure effects complete removal of the iron when carefully done, but is open to a serious objection from a health standpoint. Under the usual method of procedure, an excess of soluble ferrocyanide is sometimes left in the wine and appreciable amounts of cyanide may result therefrom.

The wine is sometimes filtered through cellulose or asbestos filter discs and inert siliceous filter aids are commonly used.

Cellulose base filter materials are considered unsuitable by certain wine makers, particularly for the filtration of fine wines, because of the danger of changing the flavor of the wine by contact with the foreign organic material. The objection to cellulose filter materials is well founded in some cases when ordinary paper pulp or other relatively unstable or impure cellulose is used.

These and other disadvantages are eliminated by the use of the process which I have discovered. I have discovered that high grade alpha cellulose clarifies wines and has no effect upon the flavor of the wines. The alpha cellulose should have a low iron content in order to obtain the best results.

Filtration of wine through a pad of alpha cellulose effects relatively complete removal of the suspended matter. The clarification is improved if some alpha cellulose fibers are dispersed in the wine before filtration. This procedure removes not only suspended matter, but also a large part of the colloidal matter. The ability of the alpha cellulose to remove colloidal matter from the wine is probably dependent upon the fact that most wine colloids are positively charged. Due to its method of manufacture the alpha cellulose contains adsorbed hydroxyl groups, which tend to neutralize and coagulate the positively charged wine colloids. Coagulation and removal of the colloidal matter is thus effected in a manner simi to the action of gelatine, casein, egg albumin, isinglass, in conjunction with filter aids. The pha cellulose possesses the added advantage th it acts as its own filter aid in the subsequent se aration of the coagulated colloidal matter.

Ordinary cellulose does not act in the sa manner, probably because it lacks the adsort hydroxyl groups. Attempts to introduce th hydroxyl groups into ordinary cellulose by a si ple treatment with strong alkali result in 1 formation of substances having a definitely de terious effect on wine or other beverages.

In most cases the iron content of the wine markedly reduced by the alpha cellulose tre ment. The amount of reduction depends up the initial iron content and upon the acidity pH of the wine or other beverage to be treat The final iron content at a given pH is fairly co stant if an adequate amount of alpha cellul is used and the treating procedure is uniform In carrying out my process, the finely divi( treating material was dispersed in the solut treated, the mixture agitated to secure good c tact, and the treating material was then filter centrifuged or allowed to settle, either with without the use of inert filter aids. In most ca I used the centrifuge which is ideally adaptec remove the finely divided treating material. 1 apparent, however, that the materials may used in the form of a bed, through which the w or other solution is allowed to percolate. B may also be formed wherein the active treat material is mixed with inert filter aids, or alt nate layers of filtering materials and iron rem ing agents may be employed.

I have found that from .2% to 1.0% of al cellulose gives a satisfactory result, the amo required varying with the pH value of the w the time of contact, the degree of dispersior the alpha cellulose fibers in the wine, the amo of impurities to be removed, the temperature, the quality of the alpha cellulose.

Alpha cellulose removes no dissolved iron fi acid wines, i. e. below pH 3.5, and the iron rem becomes progressively better in less acid soluti I have been able to reduce the iron conten sound well matured wines to below 4 p. p. n If a still lower iron content is desired, the al cellulose must be further treated. In one met for accomplishing the desired result, alpha ce lose is digested in a caustic alkali solution then thoroughly washed with pure water be use. Alpha cellulose so treated effects a be iron removal than the untreated material, bu best adapted to less acid solutions than wine, since it actually neutralizes some of the wine acids, thus causing a change in the wine flavor. For this reason, the procedure described in my co-pending application Serial No. 90,441, now Patent No. 2,105,700, is to be preferred when a relatively complete removal of dissolved iron is required from beverage more acid than pH 3.8.

Although I have described my process in connection with the clarification and removal of iron from wine, my process can also be used in connection with the clarification and removal of iron from cider, fruit juices, whiskey, beer and other beverages, vinegar and similar solutions, and in the claims I have used the term "beverages" to include all of the foregoing.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects, which may be found useful in many other applications thereof.

I claim:

1. A process for treating beverages to effect their clarification which comprises contacting the beverage with purified alpha cellulose characterized in that it contains adsorbed hydroxyl groups.

2. A process for treating beverages to effect their clarification which comprises contacting the beverage with alkali treated purified alpha cellulose containing adsorbed hydroxyl groups.

3. A process for treating beverages to effect their clarification which comprises contacting the beverage with a purified alpha cellulose which has been treated with a caustic alkali solution and washed to remove unadsorbed hydroxyl groups.

4. A process for eliminating positively charged colloids from beverages containing same which comprises neutralizing, coagulating and removing said colloids by contacting the beverage with a purified alpha cellulose containing adsorbed hydroxyl groups.

5. A process for eliminating positively charged colloids from beverages containing same which comprises adding fibers of purified alpha cellulose containing adsorbed hydroxyl groups to the beverage, agitating and separating the solids therefrom.

6. A process for eliminating positively charged colloids from beverages containing same which comprises passing the beverage through at least one filter layer composed of alpha cellulose containing adsorbed hydroxyl groups.

WILLIAM D. RAMAGE.